United States Patent
Zheng et al.

(10) Patent No.: US 12,114,200 B2
(45) Date of Patent: Oct. 8, 2024

(54) SIDELINK CONNECTION CONTROL METHOD, TERMINAL, AND NETWORK SIDE DEVICE

(71) Applicant: VIVO MOBILE COMMUNICATION CO., LTD., Guangdong (CN)

(72) Inventors: Qian Zheng, Dongguan (CN); Zichao Ji, Dongguan (CN); Xiaodong Yang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 470 days.

(21) Appl. No.: 17/245,521

(22) Filed: Apr. 30, 2021

(65) Prior Publication Data

US 2021/0250802 A1 Aug. 12, 2021

Related U.S. Application Data

(63) Continuation of application No. PCT/CN2019/114671, filed on Oct. 31, 2019.

(30) Foreign Application Priority Data

Nov. 1, 2018 (CN) .................. 201811297562.1

(51) Int. Cl.
*H04W 28/02* (2009.01)
*H04W 4/40* (2018.01)
*H04W 72/543* (2023.01)
*H04W 76/10* (2018.01)

(52) U.S. Cl.
CPC ......... *H04W 28/0268* (2013.01); *H04W 4/40* (2018.02); *H04W 72/543* (2023.01); *H04W 76/10* (2018.02)

(58) Field of Classification Search
None
See application file for complete search history.

(56) References Cited

U.S. PATENT DOCUMENTS

| | | | |
|---|---|---|---|
| 10,687,381 B2 * | 6/2020 | Lee | H04W 8/005 |
| 2017/0019910 A1 | 1/2017 | Seo | |
| 2017/0041902 A1 | 2/2017 | Sheng | |
| 2017/0285105 A1 * | 10/2017 | Uemura | H04W 72/23 |
| 2018/0020387 A1 * | 1/2018 | Van Der Velde | H04W 72/542 |
| 2018/0338319 A1 * | 11/2018 | Kim | H04L 5/0044 |

(Continued)

FOREIGN PATENT DOCUMENTS

| | | |
|---|---|---|
| CN | 106063356 A | 10/2016 |
| CN | 106793090 A | 5/2017 |

(Continued)

OTHER PUBLICATIONS

International Search Report and Written Opinion of the International Searching Authority regarding International Patent Application No. PCT/CN2019/114671, dated Feb. 1, 2020.

(Continued)

*Primary Examiner* — Mohammad S Adhami
(74) *Attorney, Agent, or Firm* — Harness, Dickey & Pierce, P.L.C.

(57) ABSTRACT

A sidelink connection control method includes: obtaining an access control parameter used to indicate sidelink connection behavior of a first terminal; and performing sidelink communication based on the access control parameter.

14 Claims, 6 Drawing Sheets

(56) References Cited

U.S. PATENT DOCUMENTS

| | | |
|---|---|---|
| 2019/0116565 A1 | 4/2019 | Chae et al. |
| 2019/0373652 A1 | 12/2019 | Hong et al. |
| 2021/0219299 A1* | 7/2021 | Peng .................. H04W 4/50 |
| 2021/0258989 A1* | 8/2021 | Zhang ................ H04W 72/20 |
| 2022/0007403 A1* | 1/2022 | Li ...................... H04W 72/23 |

FOREIGN PATENT DOCUMENTS

| | | |
|---|---|---|
| CN | 107040972 A | 8/2017 |
| CN | 108024230 A | 5/2018 |
| CN | 108141847 A | 6/2018 |
| EP | 3206452 A1 | 8/2017 |
| WO | WO-2017116108 A1 | 7/2017 |
| WO | WO-2017133644 A1 | 8/2017 |
| WO | WO-2017171447 A2 | 10/2017 |
| WO | WO-2018095156 A1 | 5/2018 |
| WO | WO-2018131935 A1 | 7/2018 |

OTHER PUBLICATIONS

"Discussion on support of unicast, groupcast and broadcast," MediaTeck Inc., 3GPP TSG RAN WG1 Meeting #94bis, R1-1810452, dated Oct. 12, 2018.
First Office Action regarding Chinese Patent Application No. 201811297562.1, dated Jan. 28, 2021. Translation provided by Bohui Intellectual Property.

* cited by examiner

SIDELINK CONNECTION CONTROL METHOD, TERMINAL, AND NETWORK SIDE DEVICE

CROSS-REFERENCE TO RELATED APPLICATIONS

This application is a Bypass Continuation Application of PCT/CN2019/114671, filed on Oct. 31, 2019, which claims priority to Chinese Patent Application No. 201811297562.1, filed on Nov. 1, 2018, which are incorporated herein by reference in their entirety.

TECHNICAL FIELD

The present disclosure relates to the field of communications technologies, and in particular, to a sidelink connection control method, a terminal, and a network side device.

BACKGROUND

A long term evolution (LTE) system starts to support a sidelink from a release 12, and the sidelink is used for direct data transmission between user equipment (UE) without using a network device.

The design of an LTE sidelink is applicable to specific public safety affairs (for example, urgent communication in disaster scenes such as fire disaster and earthquake), vehicle to everything (V2X) communication, and the like. Vehicle to everything communication includes various services, for example, basic safety-related communication, advanced (autonomous) driving, formation, and sensor extension. Because the LTE sidelink supports only broadcast communication, the LTE sidelink is mainly used for basic safety communication. Other advanced V2X services with a strict quality of service (QOS) requirement in terms of delay and reliability are supported by a new radio (NR) sidelink.

SUMMARY

An embodiment of the present disclosure provides a sidelink connection control method, applied to a first terminal, and including:
  obtaining an access control parameter used to indicate sidelink connection behavior of the first terminal; and
  performing sidelink communication based on the access control parameter.

An embodiment of the present disclosure further provides a sidelink connection control method, applied to a network side device, and including:
  sending, to a first terminal, an access control parameter used to indicate sidelink connection behavior of the first terminal.

An embodiment of the present disclosure further provides a sidelink connection control method, applied to a second terminal, and including:
  sending an access control parameter used to indicate sidelink connection behavior of the first terminal.

An embodiment of the present disclosure further provides a sidelink connection control method, applied to a terminal, and including:
  obtaining a sidelink resource pool configuration parameter sent by a network side device or preconfigured by a network, where the configuration parameter is used to indicate at least one sidelink resource pool and at least one of the following information associated with each sidelink resource pool:
  a sidelink transmission type, where the sidelink transmission type includes at least one of unicast, groupcast, or broadcast; or
  at least one QoS parameter; and
  determining a sidelink connection operation based on the configuration parameter.

An embodiment of the present disclosure further provides a sidelink connection control method, applied to a network side device, and including:
  sending a sidelink resource pool configuration parameter, where the configuration parameter is used to indicate at least one sidelink resource pool and at least one of the following information associated with each sidelink resource pool:
  a sidelink transmission type; or at least one QoS parameter.

An embodiment of the present disclosure further provides a terminal, where the terminal is a first terminal, and includes:
  a parameter obtaining module, configured to obtain an access control parameter used to indicate sidelink connection behavior of the first terminal; and
  a communications module, configured to perform sidelink communication based on the access control parameter.

An embodiment of the present disclosure further provides a network side device, including:
  a first parameter sending module, configured to send, to a first terminal, an access control parameter used to indicate sidelink connection behavior of the first terminal.

An embodiment of the present disclosure further provides a terminal, where the terminal is a second terminal, and includes:
  a second parameter sending module, configured to send an access control parameter used to indicate sidelink connection behavior of a first terminal.

An embodiment of the present disclosure further provides a terminal, including:
  a receiving module, configured to obtain a sidelink resource pool configuration parameter sent by a network side device or preconfigured by a network, where the configuration parameter is used to indicate at least one sidelink resource pool and at least one of the following information associated with each sidelink resource pool:
  a sidelink transmission type, where the sidelink transmission type includes at least one of unicast, groupcast, or broadcast; or
  at least one QoS parameter; and
  a processing module, configured to determine a sidelink connection operation based on the configuration parameter.

An embodiment of the present disclosure further provides a network side device, including:
  a third parameter sending module, configured to send a sidelink resource pool configuration parameter, where the configuration parameter is used to indicate at least one sidelink resource pool and at least one of the following information associated with each sidelink resource pool:
  a sidelink transmission type; or
  at least one QoS parameter.

An embodiment of the present disclosure further provides a terminal, including: a processor, a memory, and a program that is stored in the memory and that can be run on the processor. When the program is executed by the processor, the steps of the sidelink connection control method described above are implemented.

An embodiment of the present disclosure provides a network side device, including: a processor, a memory, and a program that is stored in the memory and that can be run on the processor. When the program is executed by the processor, the steps of the sidelink connection control method described above are implemented.

An embodiment of the present disclosure further provides a non-transitory computer-readable storage medium, where the non-transitory computer-readable storage medium stores a program, and when the program is executed by a processor, steps of the sidelink connection control method described above are implemented.

DESCRIPTION OF DRAWINGS

To describe the technical solutions in embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive another drawing from these accompanying drawings.

DETAILED DESCRIPTION OF EMBODIMENTS

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

In the embodiments of the present disclosure, the term such as "exemplary" or "for example" is used to represent giving an example, an illustration, or a description. Any embodiment or design scheme described as an "exemplary" or "example" in the embodiments of the present disclosure should not be explained as being more preferred or having more advantages than another embodiment or design scheme. To be precise, the use of the term such as "exemplary" or "for example" is intended to present a related concept in a specific manner.

Figure 1:
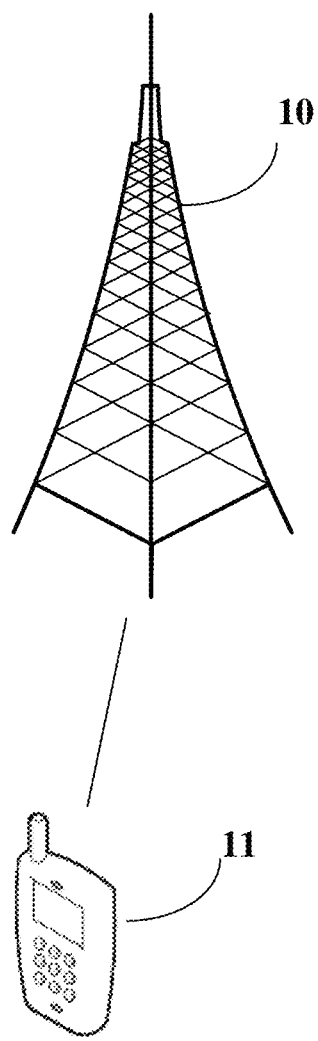
FIG. 1 is a schematic architectural diagram of a wireless communications system according to an embodiment of the present disclosure.

The embodiments of the present disclosure are described below with reference to the accompanying drawings. A sidelink connection control method, a terminal, and a network side device provided in the embodiments of the present disclosure may be applied to a wireless communications system. The wireless communications system may be a 5G system, an evolved long term evolution (eLTE) system, or a subsequent evolved communications system. FIG. 1 is a schematic structural diagram of a wireless communications system according to an embodiment of the present disclosure. As shown in FIG. 1, the wireless communications system may include: a network side device 10 and a terminal (the terminal may be alternatively referred to as a user side device). For example, the terminal is denoted as UE 11, and the UE 11 may be connected to the network side device 10. In actual application, a connection between the devices is a wireless connection. For ease of visually indicating a connection relationship between the devices, a solid line is used for illustration in FIG. 1.

It should be noted that the communications system may include a plurality of UE, and the network side device may communicate (transmit signaling or data) with the plurality of UE.

The network side device 10 provided in this embodiment of the present disclosure may be a base station, and the base station may be a common base station, or may be an evolved nodeB (evolved node base station, eNB), or may be a device such as a network side device (for example, a next generation nodeB (gNB), a transmission and reception point (transmission and reception point, TRP)), a cell in a 5G system.

The terminal provided in this embodiment of the present disclosure may be a mobile phone, a tablet computer, a notebook computer, an ultra-mobile personal computer (UMPC), a netbook, a wearable device, a vehicle-mounted device, a personal digital assistant (PDA), or the like. It should be noted that a specific type of the terminal is not limited in this embodiment of the present disclosure.

The fifth generation (5G) NR system can be used in an operating band above 6 GHz that LTE does not support, and supports a higher operating bandwidth. However, a current version of the NR system supports only an interface between a base station and a terminal, and does not support a sidelink interface for direct communication between terminals.

The NR sidelink will support multiple transmission types such as unicast, groupcast, and broadcast, and support hybrid automatic repeat request (HARQ) in the unicast and groupcast modes.

In addition, the NR sidelink also supports multiple resource allocation modes, for example, a base station scheduling mode (also called a mode 1), an autonomous resource selection mode of a terminal, and a terminal scheduling another terminal (also called a mode 2).

In an NR V2X high-density scenario, considering that processing capabilities of a base station and a terminal are limited, access control needs to be performed on terminals in the mode 1 and the mode 2 to avoid congestion. Especially for unicast and groupcast services, establishing and maintaining a point-to-point connection between a sender terminal and one or more receiver terminals requires a large amount of air interface resources, and congestion is more likely to occur. In a current research, there is no solution to performing access control on terminals in the mode 1 or the mode 2 to avoid congestion.

Figure 2:
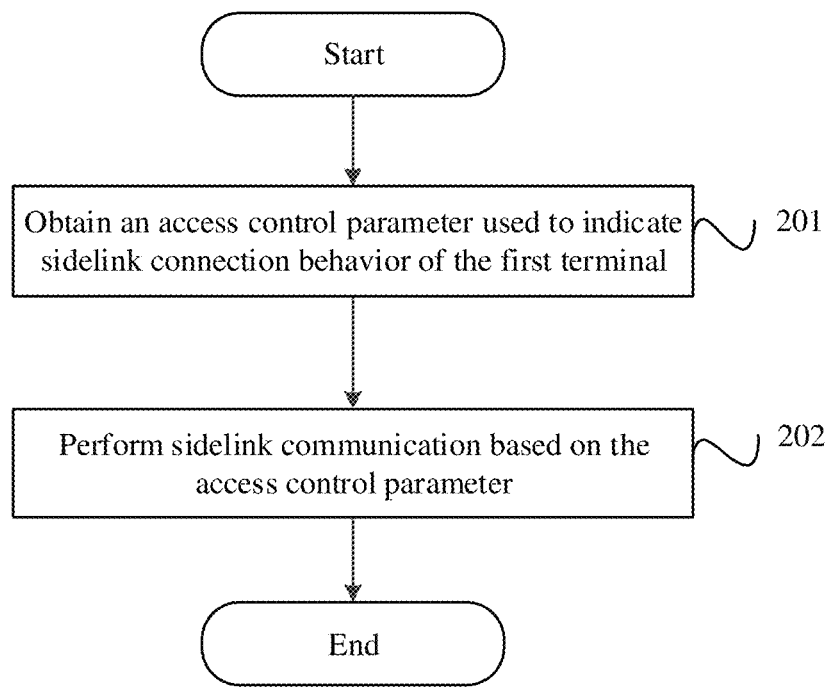
FIG. 2 is a first flowchart of steps of a sidelink connection control method according to an embodiment of the present disclosure.

As shown in FIG. 2, an embodiment of the present disclosure provides a sidelink connection control method, applied to a first terminal, and including:

Step 201, obtaining an access control parameter used to indicate sidelink connection behavior of the first terminal.

Step 202, performing sidelink communication based on the access control parameter.

In this embodiment of the present disclosure, the first terminal may perform connection management of sidelink unicast or sidelink groupcast based on the received access control parameter.

In an embodiment, when a sidelink resource allocation mode of the first terminal is a network scheduling mode, step 201 includes:
  receiving the access control parameter sent by a network side device, where the access control parameter includes at least one of the following:
  first indication information used to indicate whether sidelink transmission of the first terminal is allowed to use the resource allocation mode being network scheduling;
  first prohibition duration within which sidelink transmission of the first terminal is prohibited from using the resource allocation mode being network scheduling; or
  a first prohibition factor used to assist the first terminal in determining whether sidelink transmission of the first terminal is prohibited from using the resource allocation mode being network scheduling.

Optionally, the network side device may send the access control parameter to the first terminal by using at least one of a broadcast message or radio resource control RRC dedicated signaling. The access control parameter is used to indicate whether sidelink transmission of the first terminal is allowed to use the resource allocation mode being network scheduling.

In an embodiment, the access control parameter is used to indicate, in the following manner, that sidelink transmission of the first terminal is allowed to use the resource allocation mode being network scheduling:

Manner 1: the first indication information indicates that sidelink transmission of the first terminal is allowed to use the resource allocation mode being network scheduling.

Manner 2: the first indication information indicates that sidelink transmission of the first terminal is prohibited from using the resource allocation mode being network scheduling, and further, a random number is generated for comparison with the first prohibition factor. In the case of winning (the random number is greater than or equal to the first prohibition factor or the random number is less than or equal to the first prohibition factor), it is determined that sidelink transmission of the first terminal is allowed to use the resource allocation mode being network scheduling.

Manner 3: a random number is directly generated for comparison with the first prohibition factor. In the case of winning (the random number is greater than or equal to the first prohibition factor or the random number is less than or equal to the first prohibition factor), it is determined that sidelink transmission of the first terminal is allowed to use the resource allocation mode being network scheduling.

In another embodiment, the access control parameter is used to indicate, in the following manner, that sidelink transmission of the first terminal is prohibited from using the resource allocation mode being network scheduling:

Manner 4: the first indication information indicates that sidelink transmission of the first terminal is prohibited from using the resource allocation mode being network scheduling.

Manner 5: the first indication information indicates that sidelink transmission of the first terminal is allowed to use the resource allocation mode being network scheduling, and further, a random number is generated for comparison with the first prohibition factor. In the case of failing (the random number is greater than or equal to the first prohibition factor or the random number is less than or equal to the first prohibition factor), it is determined that sidelink transmission of the first terminal is prohibited from using the resource allocation mode being network scheduling.

Manner 6: a random number is directly generated for comparison with the first prohibition factor. In the case of failing (the random number is greater than or equal to the first prohibition factor or the random number is less than or equal to the first prohibition factor), it is determined that sidelink transmission of the first terminal is prohibited from using the resource allocation mode being network scheduling.

When it is determined, based on the access control parameter, that sidelink transmission of the first terminal is prohibited from using the resource allocation mode being network scheduling, a first prohibition timer is started based on the first prohibition duration. During running of the first prohibition timer, sidelink transmission of the first terminal is prohibited from using the resource allocation mode being network scheduling. When the first prohibition timer expires or stops, sidelink transmission of the first terminal is allowed to use the resource allocation mode being network scheduling.

It should be noted that if the first terminal determines, based on the access control parameter, that sidelink transmission of the first terminal is prohibited from using the resource allocation mode being network scheduling, the first terminal cannot send an uplink message needed by the resource allocation mode being network scheduling. The uplink message needed by the resource allocation mode being network scheduling includes at least one of a sidelink scheduling request (SR), a sidelink buffer status report (BSR), sidelink terminal information (sidelink UE Information), or terminal assistance information (UE Assistance Information).

Optionally, in this embodiment of the present disclosure, the method further includes:
  determining target information having an association relationship with the access control parameter, where the target information includes at least one of the following:
  a sidelink transmission type, where the sidelink transmission type includes at least one of unicast, groupcast, or broadcast; or
  at least one QoS parameter.

One QoS parameter includes at least one of the following information: a priority of a data packet or a data stream, a delay, reliability, a communication distance, a payload, a sending rate, or a data rate.

Continued from the foregoing example, in this embodiment of the present disclosure, step 202 includes:

determining, based on a sidelink transmission type of to-be-transmitted data, an access control parameter matching the sidelink transmission type of the to-be-transmitted data; or determining, based on a QoS requirement of to-be-transmitted data, an access control parameter matching the QoS requirement of the to-be-transmitted data; or determining, based on a sidelink transmission type of to-be-transmitted data, an access control parameter matching the sidelink transmission type of the to-be-transmitted data, and determining, based on a QoS requirement of to-be-transmitted data, an access control parameter matching the QoS requirement of the to-be-transmitted data; and running a first prohibition timer when it is determined, based on the determined access control parameter, that sidelink transmission of the first terminal is prohibited from using the resource allocation mode being network scheduling, and when the first prohibition timer stops or expires, sending, to the network side device, the uplink message needed by the resource allocation mode being network scheduling.

It should be noted that the QoS requirement of the to-be-transmitted data generally includes at least one of: a priority of the to-be-transmitted data, a delay, reliability, a communication distance, a payload, a sending rate, or a data rate.

For example, an access control parameter 1 is associated with a sidelink transmission type being unicast. When a sidelink transmission type of the to-be-transmitted data is unicast, an access control parameter matching the sidelink transmission type of the to-be-transmitted data is the access control parameter 1.

For another example, an access control parameter 2 is associated with a first QoS parameter, and the first QoS parameter includes that a priority of a data packet or a data stream is a first priority. When a priority requirement in the QoS requirement of the to-be-transmitted data is the first priority, an access control parameter matching the QoS requirement of the to-be-transmitted data is the access control parameter 2.

Continued from the foregoing example, when it is determined, based on the determined access control parameter, that sidelink transmission of the first terminal is allowed to use the resource allocation mode being network scheduling, the uplink message needed by the resource allocation mode being network scheduling is sent to the network side device.

Optionally, when the first terminal supports a resource allocation mode being autonomous selection or scheduling by another terminal, the method further includes:

running a first prohibition timer when it is determined, based on the access control parameter, that sidelink transmission of the first terminal is prohibited from using the resource allocation mode being network scheduling, and during running of the first prohibition timer, switching, by the first terminal, to the resource allocation mode being autonomous selection or scheduling by another terminal.

It should be noted that if the first terminal does not support the resource allocation mode being autonomous selection or scheduling by another terminal, when the access control parameter indicates that sidelink transmission of the first terminal is prohibited from using the resource allocation mode being network scheduling, the terminal cannot perform communication by using a sidelink.

Optionally, in this embodiment of the present disclosure, before step 201, the method further includes:

reporting, to the network side device, sidelink capability information supported by the first terminal, where the sidelink capability information includes at least one of the following:

a resource allocation mode supported by the first terminal, where the resource allocation mode includes a network scheduling mode and a terminal scheduling mode, and the terminal scheduling mode includes autonomous selection of a terminal and scheduling by another terminal;

a sidelink transmission type supported by the first terminal, where the sidelink transmission type includes at least one of unicast, groupcast, or broadcast;

a largest quantity of connections supported by the first terminal, where the largest quantity of connections includes a largest quantity of unicast connections, a largest quantity of groupcast connections, and a largest quantity of unicast connections and groupcast connections; or a QoS parameter of sidelink data of the first terminal, where the QoS parameter includes at least one of the following information: a priority, a delay, reliability, a communication distance, a payload, a sending rate, or a data rate.

After the first terminal reports the sidelink capability information supported by the first terminal to the network side device, the network side device configures the access control parameter for the first terminal based on the sidelink capability information supported by the first terminal, and sends, to the first terminal, the access control parameter configured for the first terminal. The first terminal may perform connection management of sidelink unicast or groupcast based on the received access control parameter, to resolve a congestion problem of a network or a terminal.

In another embodiment, when the sidelink resource allocation mode of the first terminal is the terminal scheduling mode, and is scheduling by another terminal, step 201 includes:

receiving the access control parameter sent by a second terminal, where the access control parameter includes at least one of the following:

second indication information used to indicate whether it is allowed to initiate a sidelink unicast establishment request or a sidelink groupcast establishment request to the second terminal;

second prohibition duration within which initiating the sidelink unicast establishment request or the sidelink groupcast establishment request to the second terminal is prohibited;

a second prohibition factor used to assist the first terminal in determining whether the first terminal is prohibited from initiating the sidelink unicast establishment request or the sidelink groupcast establishment request to the second terminal;

identifier information source ID of the second terminal sending the access control parameter;

identifier information destination ID of a terminal to which the access control parameter is applicable; or identifier information group ID of a terminal group to which the access control parameter is applicable.

Optionally, the second terminal sends the access control parameter to a neighboring terminal by using a broadcast message, and the access control parameter is used to indicate whether it is allowed to initiate a sidelink unicast establishment request or a sidelink groupcast establishment request to the second terminal;

In an embodiment, the access control parameter is used to indicate that it is allowed to initiate the sidelink unicast establishment request or the sidelink groupcast establishment request to the second terminal.

Manner 1: the first indication information indicates that it is allowed to initiate the sidelink unicast establishment request or the sidelink groupcast establishment request to the second terminal.

Manner 2: the first indication information indicates that initiating the sidelink unicast establishment request or the sidelink groupcast establishment request to the second terminal is prohibited, and further, a random number is generated for comparison with the first prohibition factor. In the case of winning (the random number is greater than or equal to the first prohibition factor or the random number is less than or equal to the first prohibition factor), it is determined that it is allowed to initiate the sidelink unicast establishment request or the sidelink groupcast establishment request to the second terminal.

Manner 3: a random number is directly generated for comparison with the first prohibition factor. In the case of winning (the random number is greater than or equal to the first prohibition factor or the random number is less than or equal to the first prohibition factor), it is determined that it is allowed to initiate the sidelink unicast establishment request or the sidelink groupcast establishment request to the second terminal.

In another embodiment, the access control parameter is used to indicate, in the following manner, that initiating the sidelink unicast establishment request or the sidelink groupcast establishment request to the second terminal is prohibited.

Manner 4: the first indication information indicates that initiating the sidelink unicast establishment request or the sidelink groupcast establishment request to the second terminal is prohibited.

Manner 5: the first indication information indicates that it is allowed to initiate the sidelink unicast establishment request or the sidelink groupcast establishment request to the second terminal, and further, a random number is generated for comparison with the first prohibition factor. In the case of failing (the random number is greater than or equal to the first prohibition factor or the random number is less than or equal to the first prohibition factor), it is determined that initiating the sidelink unicast establishment request or the sidelink groupcast establishment request to the second terminal is prohibited.

Manner 6: a random number is directly generated for comparison with the first prohibition factor. In the case of failing (the random number is greater than or equal to the first prohibition factor or the random number is less than or equal to the first prohibition factor), it is determined that initiating the sidelink unicast establishment request or the sidelink groupcast establishment request to the second terminal is prohibited.

When the access control parameter indicates that initiating the sidelink unicast establishment request or the sidelink groupcast establishment request to the second terminal is prohibited, a second prohibition timer is started based on the second prohibition duration. During running of the second prohibition timer, initiating the sidelink unicast establishment request or the sidelink groupcast establishment request to the second terminal is prohibited. When the second prohibition timer stops or expires, it is allowed to initiate the sidelink unicast establishment request or the sidelink groupcast establishment request to the second terminal.

Correspondingly, step 202 includes:

initiating the sidelink unicast establishment request or the sidelink groupcast establishment request to the second terminal when it is determined, based on the access control parameter, that the first terminal is prohibited from initiating the sidelink unicast establishment request or the sidelink groupcast establishment request to the second terminal and when the second prohibition timer is running and the second prohibition timer stops or expires.

When it is determined, based on the access control parameter, that the first terminal is allowed to initiate the sidelink unicast establishment request or the sidelink groupcast establishment request to the second terminal, the sidelink unicast establishment request or the sidelink groupcast establishment request may be directly initiated to the second terminal.

It should be noted that the access control parameter includes the identifier information of the second terminal sending the access control parameter, the identifier information of the terminal to which the access control parameter is applicable, and/or the identifier information of the terminal group to which the access control parameter is applicable. The first terminal may determine, based on a destination ID or a group ID carried in an access control parameter, whether the first terminal needs to use the corresponding access control parameter.

To sum up, in this embodiment of the present disclosure, the access control parameter is sent to the first terminal to indicate the sidelink connection behavior of the terminal, and the terminal may perform connection management of sidelink unicast or groupcast based on the received access control parameter, to resolve a congestion problem of a network or a terminal.

Figure 3:
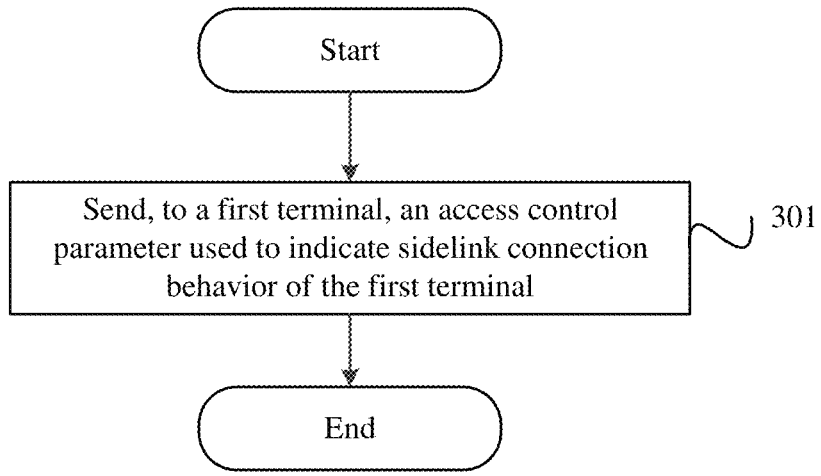
FIG. 3 is a second flowchart of steps of a sidelink connection control method according to an embodiment of the present disclosure.

As shown in FIG. 3, an embodiment of the present disclosure further provides a sidelink connection control method, applied to a network side device, and including:

Step 301, sending, to a first terminal, an access control parameter used to indicate sidelink connection behavior of the first terminal.

Optionally, the network side device may send the access control parameter to the first terminal by using at least one of a broadcast message or radio resource control RRC dedicated signaling. The access control parameter is used to indicate whether sidelink transmission of the first terminal is allowed to use a resource allocation mode being network scheduling.

Optionally, the access control parameter includes at least one of the following:

first indication information used to indicate whether sidelink transmission of the first terminal is allowed to use a resource allocation mode being network scheduling;

first prohibition duration within which sidelink transmission of the first terminal is prohibited from using the resource allocation mode being network scheduling; or a first prohibition factor used to assist the first terminal in determining whether sidelink transmission of the first terminal is prohibited from using the resource allocation mode being network scheduling.

In an embodiment, the access control parameter is used to indicate, in the following manner, that sidelink transmission of the first terminal is allowed to use the resource allocation mode being network scheduling:

Manner 1: the first indication information indicates that sidelink transmission of the first terminal is allowed to use the resource allocation mode being network scheduling.

Manner 2: the first indication information indicates that sidelink transmission of the first terminal is prohibited from using the resource allocation mode being network scheduling, and further, a random number is generated for comparison with the first prohibition factor. In the case of winning (the random number is greater than or equal to the first prohibition factor or the random number is less than or equal to the first prohibition factor), it is determined that sidelink transmission of the first terminal is allowed to use the resource allocation mode being network scheduling.

Manner 3: the random number is directly generated for comparison with the first prohibition factor. In the case of winning (the random number is greater than or equal to the first prohibition factor or the random number is less than or equal to the first prohibition factor), it is determined that sidelink transmission of the first terminal is allowed to use the resource allocation mode being network scheduling.

In another embodiment, the access control parameter is used to indicate, in the following manner, that sidelink transmission of the first terminal is prohibited from using the resource allocation mode being network scheduling:

Manner 4: the first indication information indicates that sidelink transmission of the first terminal is prohibited from using the resource allocation mode being network scheduling.

Manner 5: the first indication information indicates that sidelink transmission of the first terminal is allowed to use the resource allocation mode being network scheduling, and further, a random number is generated for comparison with the first prohibition factor. In the case of failing (the random number is greater than or equal to the first prohibition factor or the random number is less than or equal to the first prohibition factor), it is determined that sidelink transmission of the first terminal is prohibited from using the resource allocation mode being network scheduling.

Manner 6: the random number is directly generated for comparison with the first prohibition factor. In the case of failing (the random number is greater than or equal to the first prohibition factor or the random number is less than or equal to the first prohibition factor), it is determined that sidelink transmission of the first terminal is prohibited from using the resource allocation mode being network scheduling.

When the access control parameter indicates that sidelink transmission of the first terminal is prohibited from using the resource allocation mode being network scheduling, a first prohibition timer is started based on the first prohibition duration.

It should be noted that if the first terminal determines, based on the access control parameter, that sidelink transmission of the first terminal is prohibited from using the resource allocation mode being network scheduling, the first terminal cannot send an uplink message needed by the resource allocation mode being network scheduling. The uplink message needed by the resource allocation mode being network scheduling includes at least one of a sidelink scheduling request (SR), a sidelink buffer status report (BSR), sidelink terminal information (sidelink UE Information), or terminal assistance information (UE Assistance Information).

Optionally, in this embodiment of the present disclosure, there is an association relationship between the access control parameter and target information, and the target information includes at least one of the following:

a sidelink transmission type, where the sidelink transmission type includes at least one of unicast, groupcast, or broadcast; or at least one QoS parameter. One QoS parameter includes at least one of the following information: a priority of a data packet or a data stream, a delay, reliability, a communication distance, a payload, a sending rate, and a data rate.

Optionally, in this embodiment of the present disclosure, the method further includes:

receiving sidelink capability information supported by the first terminal and reported by the first terminal, where the sidelink capability information includes at least one of the following:

a resource allocation mode supported by the first terminal, where the resource allocation mode includes a network scheduling mode and a terminal scheduling mode, and the terminal scheduling mode includes autonomous selection of a terminal and scheduling by another terminal;

a transmission type supported by the first terminal, where the sidelink transmission type includes at least one of unicast, groupcast, or broadcast;

a largest quantity of connections supported by the first terminal, where the largest quantity of connections includes a largest quantity of unicast connections, a largest quantity of groupcast connections, and a largest quantity of unicast connections and groupcast connections; or a QoS parameter of sidelink data of the first terminal, where the QoS parameter includes at least one of the following information: a priority, a delay, reliability, a communication distance, a payload, a sending rate, or a data rate.

Correspondingly, step 301 includes:

sending the access control parameter to the first terminal based on the sidelink capability information supported by the first terminal.

After the first terminal reports the sidelink capability information supported by the first terminal to the network side device, the network side device configures the access control parameter for the first terminal based on the sidelink capability information supported by the first terminal, and sends, to the first terminal, the access control parameter configured for the first terminal. The first terminal may perform connection management of sidelink unicast or groupcast based on the received access control parameter, to resolve a congestion problem of a network or a terminal.

Figure 4:
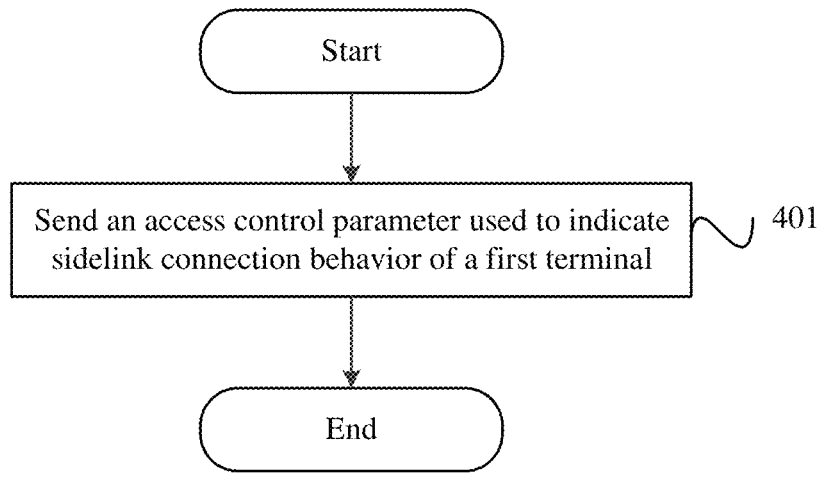
FIG. 4 is a third flowchart of steps of a sidelink connection control method according to an embodiment of the present disclosure.

As shown in FIG. 4, an embodiment of the present disclosure further provides a sidelink connection control method, applied to a second terminal, and including:

Step 401, sending an access control parameter used to indicate sidelink connection behavior of a first terminal.

Optionally, the second terminal sends the access control parameter to a neighboring terminal by using a broadcast message, and the access control parameter is used to indicate whether it is allowed to initiate a sidelink unicast establishment request or a sidelink groupcast establishment request to the second terminal.

Optionally, the access control parameter includes at least one of the following:

second indication information used to indicate whether it is allowed to initiate the sidelink unicast establishment request or the sidelink groupcast establishment request to the second terminal;

second prohibition duration within which initiating the sidelink unicast establishment request or the sidelink groupcast establishment request to the second terminal is prohibited;

a second prohibition factor used to assist the first terminal in determining whether the first terminal is prohibited from initiating the sidelink unicast establishment request or the sidelink groupcast establishment request to the second terminal;

identifier information of the second terminal sending the access control parameter;

identifier information of a terminal to which the access control parameter is applicable; or identifier information of a terminal group to which the access control parameter is applicable.

In an embodiment, the access control parameter is used to indicate it is allowed to initiate the sidelink unicast establishment request or the sidelink groupcast establishment request to the second terminal.

Manner 1: the first indication information indicates that it is allowed to initiate the sidelink unicast establishment request or the sidelink groupcast establishment request to the second terminal.

Manner 2: the first indication information indicates that initiating the sidelink unicast establishment request or the sidelink groupcast establishment request to the second terminal is prohibited, and further, a random number is generated for comparison with a first prohibition factor. In the case of winning (the random number is greater than or equal to the first prohibition factor or the random number is less than or equal to the first prohibition factor), it is determined that it is allowed to initiate the sidelink unicast establishment request or the sidelink groupcast establishment request to the second terminal.

Manner 3: the random number is directly generated for comparison with the first prohibition factor. In the case of winning (the random number is greater than or equal to the first prohibition factor or the random number is less than or equal to the first prohibition factor), it is determined that it is allowed to initiate the sidelink unicast establishment request or the sidelink groupcast establishment request to the second terminal.

In another embodiment, the access control parameter is used to indicate, in the following manner, that initiating the sidelink unicast establishment request or the sidelink groupcast establishment request to the second terminal is prohibited.

Manner 4: the first indication information indicates that initiating the sidelink unicast establishment request or the sidelink groupcast establishment request to the second terminal is prohibited.

Manner 5: the first indication information indicates that it is allowed to initiate the sidelink unicast establishment request or the sidelink groupcast establishment request to the second terminal, and further, a random number is generated for comparison with a first prohibition factor. In the case of failing (the random number is greater than or equal to the first prohibition factor or the random number is less than or equal to the first prohibition factor), it is determined that initiating the sidelink unicast establishment request or the sidelink groupcast establishment request to the second terminal is prohibited.

Manner 6: the random number is directly generated for comparison with the first prohibition factor. In the case of failing (the random number is greater than or equal to the first prohibition factor or the random number is less than or equal to the first prohibition factor), it is determined that initiating the sidelink unicast establishment request or the sidelink groupcast establishment request to the second terminal is prohibited.

When the access control parameter indicates that initiating the sidelink unicast establishment request or the sidelink groupcast establishment request to the second terminal is prohibited, a second prohibition timer is started based on the second prohibition duration. During running of the second prohibition timer, initiating the sidelink unicast establishment request or the sidelink groupcast establishment request to the second terminal is prohibited. When the second prohibition timer stops or expires, it is allowed to initiate the sidelink unicast establishment request or the sidelink groupcast establishment request to the second terminal.

It should be noted that the access control parameter includes the identifier information of the second terminal sending the access control parameter, the identifier information of the terminal to which the access control parameter is applicable, and/or the identifier information of the terminal group to which the access control parameter is applicable. The first terminal may determine, based on a destination ID or a group ID carried in an access control parameter, whether the first terminal needs to use the corresponding access control parameter.

To sum up, in this embodiment of the present disclosure, the access control parameter is sent to the first terminal to indicate the sidelink connection behavior of the terminal, and the terminal may perform connection management of sidelink unicast or groupcast based on the received access control parameter, to resolve a congestion problem of a network or a terminal.

Figure 5:
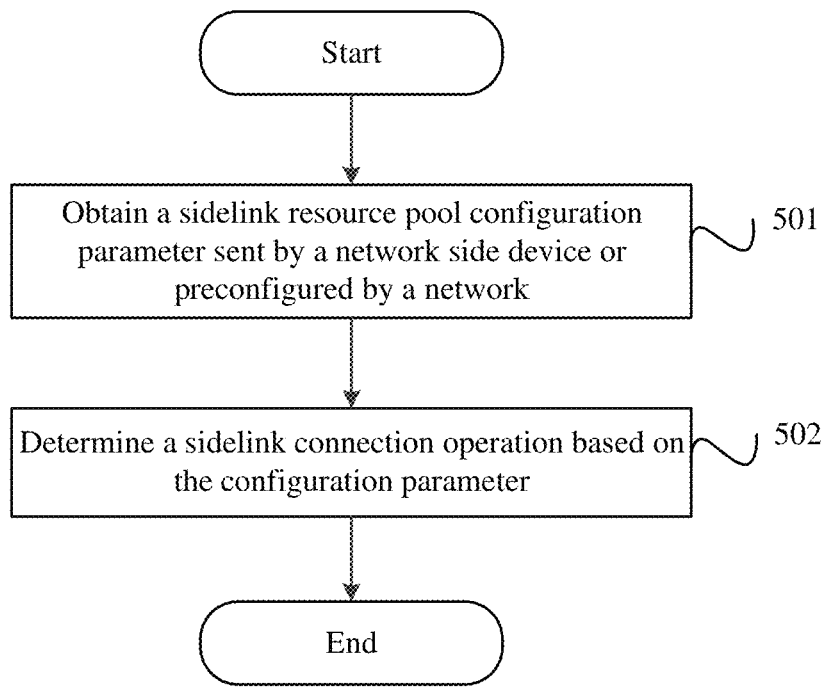
FIG. 5 is a fourth flowchart of steps of a sidelink connection control method according to an embodiment of the present disclosure.

As shown in FIG. 5, an embodiment of the present disclosure further provides a sidelink connection control method, applied to a terminal, and including:

Step 501, obtaining a sidelink resource pool configuration parameter sent by a network side device or preconfigured by a network, where the configuration parameter is used to indicate at least one sidelink resource pool and at least one of the following information associated with each sidelink resource pool:

a sidelink transmission type, where the sidelink transmission type includes at least one of unicast, groupcast, or broadcast; or at least one QoS parameter, where one QoS parameter includes at least one of the following information: a priority of a data packet or a data stream, a delay, reliability, a communication distance, a payload, a sending rate, or a data rate.

Step 502, determining a sidelink connection operation based on the configuration parameter.

Optionally, when one sidelink resource pool is associated with at least two QoS parameters, one congestion level range of the sidelink resource pool is associated with one QoS parameter, and different congestion level ranges are associated with different QoS parameters.

For example, one sidelink resource pool is associated with three QoS parameters (namely, a QoS parameter 1, a QoS parameter 2, and a QoS parameter 3). Then, a first congestion level range of the sidelink resource pool is associated with the QoS parameter 1, a second congestion level range is associated with the QoS parameter 2, and a third congestion level range is associated with the QoS parameter 3.

Correspondingly, the method further includes:

measuring a sidelink resource pool associated with at least two QoS parameters, to determine a congestion level of the sidelink resource pool; and determining, based on the congestion level of the sidelink resource pool, one QoS parameter associated with a congestion level range to which the congestion level belongs.

Subsequently, a QoS requirement of to-be-transmitted data is compared with a QoS parameter associated with a congestion level range to which a congestion level of a sidelink resource pool belongs. Alternatively, subsequently, a QoS parameter of to-be-transmitted data is compared with an only QoS parameter associated with a sidelink resource pool.

In an embodiment, step 502 includes:

determining, based on the configuration parameter, whether there is a sidelink resource pool matching a sidelink transmission type of to-be-transmitted data, or whether there is a sidelink resource pool matching a QoS requirement of to-be-transmitted data, or whether there is a sidelink resource pool matching the sidelink transmission type of to-be-transmitted data and a sidelink resource pool matching the QoS requirement of to-be-transmitted data; and if there is no sidelink resource pool matching the sidelink transmission type of the to-be-transmitted data, or there is no sidelink resource pool matching the QoS requirement of the to-be-transmitted data, or there is no sidelink resource pool with the sidelink transmission type of the to-be-transmitted data and no sidelink resource pool matching the QoS requirement of the to-be-transmitted data, or the terminal has not selected a sidelink resource needed by the to-be-transmitted data, determining to prohibit the terminal from initiating the following operations: a sidelink unicast or sidelink groupcast establishment request, a sidelink unicast bearer or sidelink groupcast bearer addition operation, a sidelink unicast bearer or sidelink groupcast bearer modification operation, and a sidelink unicast bearer or sidelink groupcast bearer release operation.

For example, a sidelink resource pool 1 is associated with a sidelink transmission type being unicast. When the sidelink transmission type of the to-be-transmitted data is unicast, a sidelink resource pool matching the sidelink transmission type of the to-be-transmitted data is the sidelink resource pool 1.

For another example, a sidelink resource pool 2 is associated with a first QoS parameter. The first QoS parameter includes that a priority of a data packet or a data stream is a first priority. When a priority requirement in the QoS requirement of the to-be-transmitted data is the first priority, a sidelink resource pool matching the QOS requirement of the to-be-transmitted data is the sidelink resource pool 2.

It should be noted that when one sidelink resource pool is associated with at least two QoS parameters, the terminal needs to measure the sidelink resource pool to determine an only QoS parameter associated with a current congestion level, so that in a subsequent process of matching a sidelink resource pool, the terminal needs to perform comparison by using the QoS parameter determined by the terminal.

In an embodiment, when the terminal has not established a sidelink unicast connection or a sidelink groupcast connection, if there is a sidelink resource pool matching the sidelink transmission type of the to-be-transmitted data, or there is a sidelink resource pool matching the QOS requirement of the to-be-transmitted data, or there is a sidelink resource pool matching the sidelink transmission type of the to-be-transmitted data and a sidelink resource pool matching the QoS requirement of the to-be-transmitted data; and the terminal has selected a sidelink resource needed by the to-be-transmitted data, it is determined to allow the terminal to initiate the sidelink unicast establishment request or the sidelink groupcast establishment request.

If a sidelink resource indicated in the configuration parameter does not include a sidelink resource pool matching the sidelink transmission type and/or the QoS requirement of the to-be-transmitted data, or the terminal has not selected a sidelink resource needed by the to-be-transmitted data, it is determined that initiating the sidelink unicast establishment request or the sidelink groupcast establishment request to the terminal is prohibited.

In another embodiment, when the terminal has established a sidelink unicast connection or a sidelink groupcast connection, if there is a sidelink resource pool matching the sidelink transmission type and/or the QoS requirement of the to-be-transmitted data, and the terminal has selected a sidelink resource needed by the to-be-transmitted data, it is determined to allow the terminal to initiate the sidelink unicast bearer or sidelink groupcast bearer addition operation or modification operation, or initiate the sidelink unicast bearer or sidelink groupcast bearer addition operation and modification operation.

If there is no sidelink resource pool matching the sidelink transmission type and/or the QoS requirement of the to-be-transmitted data, or the terminal has not selected a sidelink resource needed by the to-be-transmitted data, it is determined to allow the terminal to initiate the sidelink unicast bearer or sidelink groupcast bearer release operation.

Optionally, in this embodiment of the present disclosure, the method further includes:

reporting, to the network side device, sidelink capability information supported by the terminal, where the sidelink capability information includes at least one of the following:

a resource allocation mode supported by the terminal, where the resource allocation mode includes a network scheduling mode and a terminal scheduling mode, and the terminal scheduling mode includes autonomous selection of a terminal and scheduling by another terminal;

a sidelink transmission type supported by the terminal, where the sidelink transmission type includes at least one of unicast, groupcast, or broadcast;

a largest quantity of connections supported by the terminal, where the largest quantity of connections includes a largest quantity of unicast connections, a largest quantity of groupcast connections, and a largest quantity of unicast connections and groupcast connections; or a QoS parameter of sidelink data of the terminal, where the QoS parameter includes at least one of the following information: a priority, a delay, reliability, a communication distance, a payload, a sending rate, or a data rate.

To sum up, in this embodiment of the present disclosure, the configuration parameter of the sidelink resource pool is configured for the terminal, so that the terminal can determine, based on the configuration parameter, to perform sidelink unicast or groupcast bearer operation management, to resolve a congestion problem of a network or a terminal.

Figure 6:
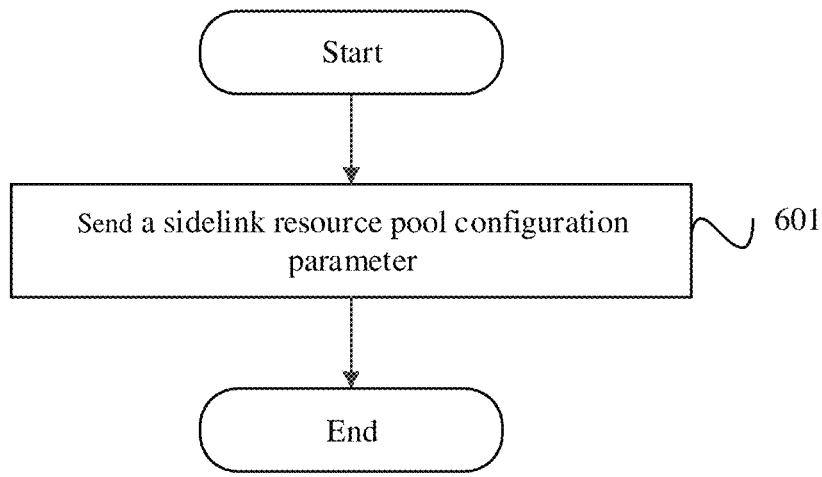
FIG. 6 is a fifth flowchart of steps of a sidelink connection control method according to an embodiment of the present disclosure.

As shown in FIG. 6, an embodiment of the present disclosure further provides a sidelink connection control method, applied to a network side device, and including:

Step 601, sending a sidelink resource pool configuration parameter, where the configuration parameter is used to indicate at least one sidelink resource pool and at least one of the following information associated with each sidelink resource pool:

a sidelink transmission type; or at least one QoS parameter, where one QoS parameter includes at least one of the following information: a priority of a data packet or a data stream, a delay, reliability, a communication distance, a payload, a sending rate, or a data rate.

Optionally, when one sidelink resource pool is associated with at least two QoS parameters, one congestion level range of the sidelink resource pool is associated with one QoS parameter, and different congestion level ranges are associated with different QoS parameters.

For example, one sidelink resource pool is associated with three QoS parameters (namely, a QoS parameter 1, a QoS parameter 2, and a QoS parameter 3), a first congestion level range of the sidelink resource pool is associated with the QoS parameter 1, a second congestion level range is associated with the QoS parameter 2, and a third congestion level range is associated with the QoS parameter 3.

Optionally, in this embodiment of the present disclosure, the method further includes:

receiving sidelink capability information supported by a terminal and reported by the terminal, where the sidelink capability information includes at least one of the following:

a resource allocation mode supported by the terminal, where the resource allocation mode includes a network scheduling mode and a terminal scheduling mode, and the terminal scheduling mode includes autonomous selection of a terminal and scheduling by another terminal;

a sidelink transmission type supported by the terminal, where the sidelink transmission type includes at least one of unicast, groupcast, or broadcast;

a largest quantity of connections supported by the terminal, where the largest quantity of connections includes a largest quantity of unicast connections, a largest quantity of groupcast connections, and a largest quantity of unicast connections and groupcast connections; or a QoS parameter of sidelink data of the terminal, where the QoS parameter includes at least one of the following information: a priority, a delay, reliability, a communication distance, a payload, a sending rate, or a data rate.

Correspondingly, step 601 includes:

sending the sidelink resource pool configuration parameter based on the sidelink capability information supported by the terminal.

After the terminal reports the sidelink capability information supported by the terminal to the network side device, the network side device configures, for the terminal based on the sidelink capability information supported by the terminal, a sidelink resource pool and information associated with the sidelink resource pool, and sends the configuration parameter to the terminal, so that the terminal can perform sidelink unicast or groupcast bearer operation management based on the configuration parameter, to resolve a congestion problem of a network or a terminal.

Figure 7:
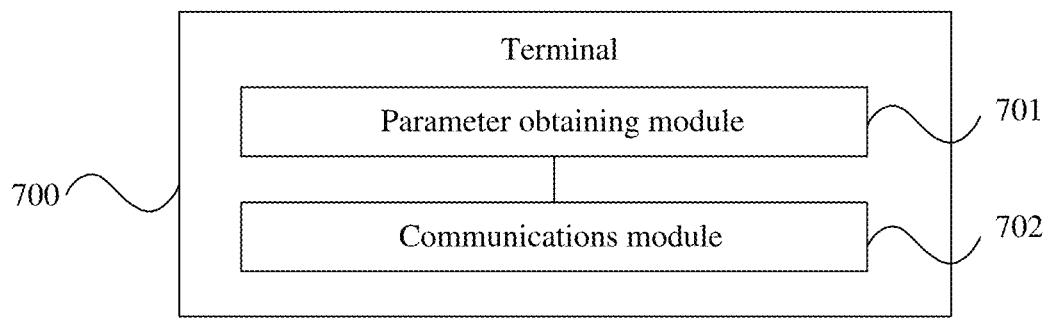
FIG. 7 is a first schematic structural diagram of a terminal according to an embodiment of the present disclosure.

As shown in FIG. 7, an embodiment of the present disclosure further provides a terminal 700, where the terminal is a first terminal, and includes:

a parameter obtaining module 701, configured to obtain an access control parameter used to indicate sidelink connection behavior of the first terminal; and a communications module 702, configured to perform sidelink communication based on the access control parameter.

Optionally, in this embodiment of the present disclosure, the parameter obtaining module 701 includes:

a first parameter obtaining submodule, configured to receive the access control parameter sent by a network side device, where the access control parameter includes at least one of the following:

first indication information used to indicate whether sidelink transmission of the first terminal is allowed to use a resource allocation mode being network scheduling;

first prohibition duration within which sidelink transmission of the first terminal is prohibited from using the resource allocation mode being network scheduling; or a first prohibition factor used to assist the first terminal in determining whether sidelink transmission of the first terminal is prohibited from using the resource allocation mode being network scheduling.

Optionally, in this embodiment of the present disclosure, the terminal further includes:

an information determining module, configured to determine target information having an association relationship with the access control parameter, where the target information includes at least one of the following:

a sidelink transmission type, where the sidelink transmission type includes at least one of unicast, groupcast, or broadcast; or at least one QoS parameter.

Optionally, in this embodiment of the present disclosure, the communications module 702 includes:

a first parameter determining submodule, configured to determine, based on a sidelink transmission type of to-be-transmitted data, an access control parameter matching the sidelink transmission type of the to-be-transmitted data, or the first parameter determining submodule, configured to determine, based on a QoS requirement of to-be-transmitted data, an access control parameter matching the QoS requirement of the to-be-transmitted data; or the first parameter determining submodule, configured to determine, based on the sidelink transmission type of to-be-transmitted data, an access control parameter matching the sidelink transmission type of the to-be-transmitted data, and determine, based on the QoS requirement of to-be-transmitted data, an access control parameter matching the QoS requirement of the to-be-transmitted data;

a first communications submodule, configured to run a first prohibition timer when it is determined, based on the determined access control parameter, that sidelink transmission of the first terminal is prohibited from using the resource allocation mode being network scheduling, and when the first prohibition timer stops or expires, send, to the network side device, an uplink message needed by the resource allocation mode being network scheduling.

Optionally, in this embodiment of the present disclosure, when the first terminal supports a resource allocation mode being autonomous selection or scheduling by another terminal, the terminal further includes:

a first switching module, configured to run a first prohibition timer when it is determined, based on the access control parameter, that sidelink transmission of the first terminal is prohibited from using the resource allocation mode being network scheduling, and during running of the first prohibition timer, switch, by the first terminal, to the resource allocation mode being autonomous selection or scheduling by another terminal.

Optionally, in this embodiment of the present disclosure, the parameter obtaining module 701 includes:

a second parameter obtaining submodule, configured to receive the access control parameter sent by a second terminal, where the access control parameter includes at least one of the following:

second indication information used to indicate whether it is allowed to initiate a sidelink unicast establishment request or a sidelink groupcast establishment request to the second terminal;

second prohibition duration within which initiating the sidelink unicast establishment request or the sidelink groupcast establishment request to the second terminal is prohibited;

a second prohibition factor used to assist the first terminal in determining whether the first terminal is prohibited from initiating the sidelink unicast establishment request or the sidelink groupcast establishment request to the second terminal;

identifier information of the second terminal sending the access control parameter;

identifier information of a terminal to which the access control parameter is applicable; or identifier information of a terminal group to which the access control parameter is applicable.

Optionally, in this embodiment of the present disclosure, the communications module 702 includes:

a second communications submodule, configured to initiate the sidelink unicast establishment request or the sidelink groupcast establishment request to the second terminal when it is determined, based on the access control parameter, that the first terminal is prohibited from initiating the sidelink unicast establishment request or the sidelink groupcast establishment request to the second terminal and when a second prohibition timer is running and the second prohibition timer stops or expires.

To sum up, in this embodiment of the present disclosure, the access control parameter is sent to the first terminal to indicate the sidelink connection behavior of the terminal, and the terminal may perform connection management of sidelink unicast or groupcast based on the received access control parameter, to resolve a congestion problem of a network or a terminal.

It should be noted that the terminal provided in this embodiment of the present disclosure is a terminal capable of performing the sidelink connection control method, all embodiments of the sidelink connection control method are applicable to the terminal, and a same or similar beneficial effect can be achieved.

Optionally, an embodiment of the present disclosure further provides a terminal, including a processor, a memory, and a program that is stored in the memory and that can be run on the processor. When the program is executed by the processor, processes of the sidelink connection control method embodiment are implemented, and a same technical effect can be achieved. To avoid repetition, details are not described herein again.

An embodiment of the present disclosure further provides a non-transitory computer-readable storage medium. The non-transitory computer-readable storage medium stores a program, and when the program is executed by a processor, processes of the sidelink connection control method embodiment are implemented, and a same technical effect can be achieved. To avoid repetition, details are not described herein again. The non-transitory computer-readable storage medium is, for example, a read-only memory (Read-Only Memory, ROM for short), a random access memory (Random Access Memory, RAM for short), a magnetic disk, or an optical disc.

Figure 8:
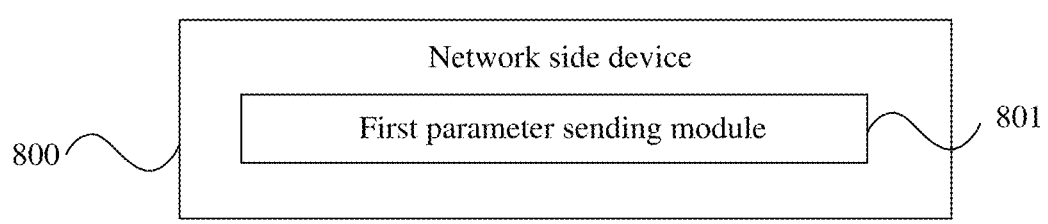
FIG. 8 is a first schematic structural diagram of a network side device according to an embodiment of the present disclosure.

As shown in FIG. 8, an embodiment of the present disclosure further provides a network side device 800, including:

a first parameter sending module 801, configured to send, to a first terminal, an access control parameter used to indicate sidelink connection behavior of the first terminal.

Optionally, in this embodiment of the present disclosure, the access control parameter includes at least one of the following:

first indication information used to indicate whether sidelink transmission of the first terminal is allowed to use a resource allocation mode being network scheduling;

first prohibition duration within which sidelink transmission of the first terminal is prohibited from using the resource allocation mode being network scheduling; or a first prohibition factor used to assist the first terminal in determining whether sidelink transmission of the first terminal is prohibited from using the resource allocation mode being network scheduling.

Optionally, in this embodiment of the present disclosure, there is an association relationship between the access control parameter and target information, and the target information includes at least one of the following:

a sidelink transmission type, where the sidelink transmission type includes at least one of unicast, groupcast, or broadcast; or at least one QoS parameter.

To sum up, in this embodiment of the present disclosure, the access control parameter is sent to the first terminal to indicate the sidelink connection behavior of the terminal, and the terminal may perform connection management of sidelink unicast or groupcast based on the received access control parameter, to resolve a congestion problem of a network or a terminal.

It should be noted that the network side device provided in this embodiment of the present disclosure is a network side device capable of performing the sidelink connection control method, all embodiments of the sidelink connection control method are applicable to the network side device, and a same or similar beneficial effect can be achieved.

Optionally, an embodiment of the present disclosure further provides a network side device, including a processor, a memory, and a program that is stored in the memory and that can be run on the processor. When the program is executed by the processor, processes of the sidelink connection control method embodiment are implemented, and a same technical effect can be achieved. To avoid repetition, details are not described herein again.

An embodiment of the present disclosure further provides a non-transitory computer-readable storage medium. The non-transitory computer-readable storage medium stores a program, and when the program is executed by a processor, processes of the sidelink connection control method embodiment are implemented, and a same technical effect can be achieved. To avoid repetition, details are not described herein again. The non-transitory computer-readable storage medium is, for example, a read-only memory (Read-Only Memory, ROM for short), a random access memory (Random Access Memory, RAM for short), a magnetic disk, or an optical disc.

Figure 9:
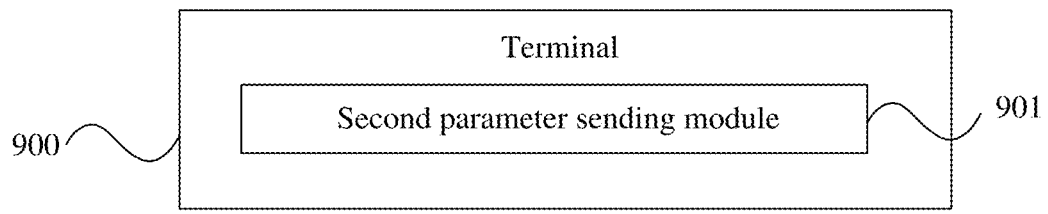
FIG. 9 is a second schematic structural diagram of a terminal according to an embodiment of the present disclosure.

As shown in FIG. 9, an embodiment of the present disclosure further provides a terminal 900, where the terminal is a second terminal, and includes:

a second parameter sending module 901, configured to send an access control parameter used to indicate sidelink connection behavior of a first terminal.

Optionally, in this embodiment of the present disclosure, the access control parameter includes at least one of the following:

second indication information used to indicate whether it is allowed to initiate a sidelink unicast establishment request or a sidelink groupcast establishment request to the second terminal;

second prohibition duration within which initiating the sidelink unicast establishment request or the sidelink groupcast establishment request to the second terminal is prohibited;

a second prohibition factor used to assist the first terminal in determining whether the first terminal is prohibited from initiating the sidelink unicast establishment request or the sidelink groupcast establishment request to the second terminal;

identifier information of the second terminal sending the access control parameter;

identifier information of a terminal to which the access control parameter is applicable; or identifier information of a terminal group to which the access control parameter is applicable.

To sum up, in this embodiment of the present disclosure, the access control parameter is sent to the first terminal to indicate the sidelink connection behavior of the terminal, and the terminal may perform connection management of sidelink unicast or groupcast based on the received access control parameter, to resolve a congestion problem of a network or a terminal.

It should be noted that the terminal provided in this embodiment of the present disclosure is a terminal capable of performing the sidelink connection control method, all embodiments of the sidelink connection control method are applicable to the terminal, and a same or similar beneficial effect can be achieved.

Optionally, an embodiment of the present disclosure further provides a terminal, including a processor, a memory, and a program that is stored in the memory and that can be run on the processor. When the program is executed by the processor, processes of the sidelink connection control method embodiment are implemented, and a same technical effect can be achieved. To avoid repetition, details are not described herein again.

An embodiment of the present disclosure further provides a non-transitory computer-readable storage medium. The non-transitory computer-readable storage medium stores a program, and when the program is executed by a processor, processes of the sidelink connection control method embodiment are implemented, and a same technical effect can be achieved. To avoid repetition, details are not described herein again. The non-transitory computer-readable storage medium is, for example, a read-only memory (Read-Only Memory, ROM for short), a random access memory (Random Access Memory, RAM for short), a magnetic disk, or an optical disc.

Figure 10:
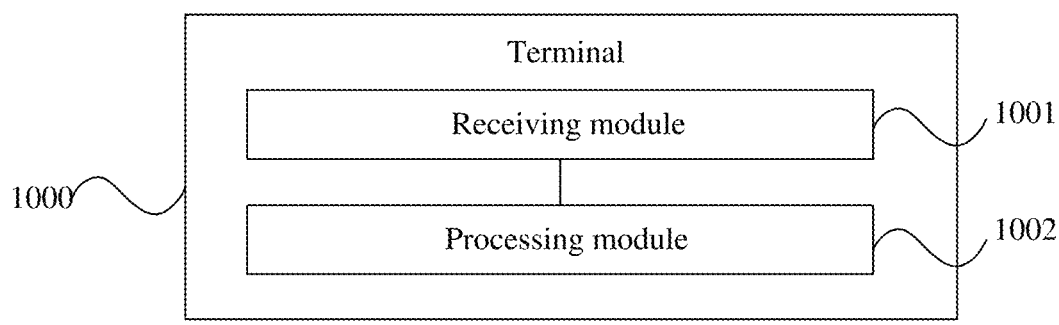
FIG. 10 is a third schematic structural diagram of a terminal according to an embodiment of the present disclosure.

As shown in FIG. 10, an embodiment of the present disclosure further provides a terminal 1000, including:

a receiving module 1001, configured to obtain a sidelink resource pool configuration parameter sent by a network side device or preconfigured by a network, where the configuration parameter is used to indicate at least one sidelink resource pool and at least one of the following information associated with each sidelink resource pool:

a sidelink transmission type, where the sidelink transmission type includes at least one of unicast, groupcast, or broadcast; or at least one QoS parameter; and a processing module 1002, configured to determine a sidelink connection operation based on the configuration parameter.

Optionally, in this embodiment of the present disclosure, when one sidelink resource pool is associated with at least two QoS parameters, one congestion level range of the sidelink resource pool is associated with one QoS parameter, and different congestion level ranges are associated with different QoS parameters.

Optionally, in this embodiment of the present disclosure, the terminal further includes:

a measurement module, configured to measure a sidelink resource pool associated with at least two QoS parameters, to determine a congestion level of the sidelink resource pool; and a determining module, configured to determine, based on the congestion level of the sidelink resource pool, one QoS parameter associated with a congestion level range to which the congestion level belongs.

Optionally, in this embodiment of the present disclosure, when the terminal currently has not established a sidelink unicast connection or a sidelink groupcast connection, the processing module includes:

a first association determining submodule, configured to determine, based on the configuration parameter, whether there is a sidelink resource pool matching a sidelink transmission type and/or a QoS requirement of to-be-transmitted data; and a first processing submodule, configured to: if there is no sidelink resource pool matching the sidelink transmission type and/or the QoS requirement of the to-be-transmitted data, or the terminal has not selected a sidelink resource needed by the to-be-transmitted data, determine to prohibit the terminal from initiating the following operations: a sidelink unicast or sidelink groupcast establishment request, a sidelink unicast bearer or sidelink groupcast bearer addition operation, a sidelink unicast bearer or sidelink groupcast bearer modification operation, and a sidelink unicast bearer or sidelink groupcast bearer release operation.

In this embodiment of the present disclosure, the network side device configures, for the terminal based on sidelink capability information supported by a terminal, a sidelink resource pool and information associated with the sidelink resource pool, and sends the configuration parameter to the terminal, so that the terminal can perform sidelink unicast or groupcast bearer operation management based on the configuration parameter, to resolve a congestion problem of a network or a terminal.

It should be noted that the terminal provided in this embodiment of the present disclosure is a terminal capable of performing the sidelink connection control method, all embodiments of the sidelink connection control method are applicable to the terminal, and a same or similar beneficial effect can be achieved.

Optionally, an embodiment of the present disclosure further provides a terminal, including a processor, a memory, and a program that is stored in the memory and that can be run on the processor. When the program is executed by the processor, processes of the sidelink connection control method embodiment are implemented, and a same technical effect can be achieved. To avoid repetition, details are not described herein again.

An embodiment of the present disclosure further provides a non-transitory computer-readable storage medium. The non-transitory computer-readable storage medium stores a program, and when the program is executed by a processor, processes of the sidelink connection control method embodiment are implemented, and a same technical effect can be achieved. To avoid repetition, details are not described herein again. The non-transitory computer-readable storage medium is, for example, a read-only memory (Read-Only Memory, ROM for short), a random access memory (Random Access Memory, RAM for short), a magnetic disk, or an optical disc.

Figure 11:
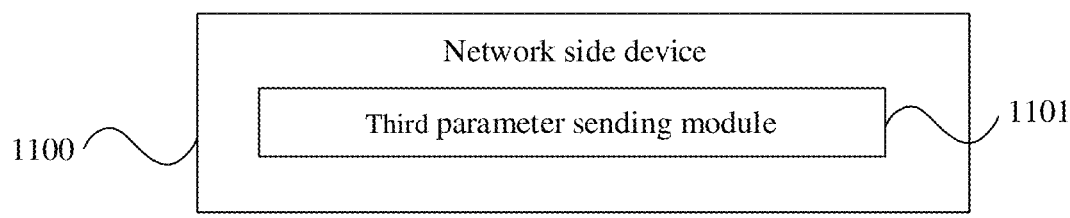
FIG. 11 is a second schematic structural diagram of a network side device according to an embodiment of the present disclosure.

As shown in FIG. 11, an embodiment of the present disclosure further provides a network side device 1100, including:

a third parameter sending module 1101, configured to send a sidelink resource pool configuration parameter, where the configuration parameter is used to indicate at least one sidelink resource pool and at least one of the following information associated with each sidelink resource pool:
a sidelink transmission type; or
at least one QoS parameter.

Optionally, in this embodiment of the present disclosure, when one sidelink resource pool is associated with at least two QoS parameters, one congestion level range of the sidelink resource pool is associated with one QoS parameter, and different congestion level ranges are associated with different QoS parameters.

In this embodiment of the present disclosure, the network side device configures, for the terminal based on sidelink capability information supported by a terminal, a sidelink resource pool and information associated with the sidelink resource pool, and sends the configuration parameter to the terminal, so that the terminal can perform sidelink unicast or groupcast bearer operation management based on the configuration parameter, to resolve a congestion problem of a network or a terminal.

It should be noted that the network side device provided in this embodiment of the present disclosure is a network side device capable of performing the sidelink connection control method, all embodiments of the sidelink connection control method are applicable to the network side device, and a same or similar beneficial effect can be achieved.

Optionally, an embodiment of the present disclosure further provides a network side device, including a processor, a memory, and a program that is stored in the memory and that can be run on the processor. When the program is executed by the processor, processes of the sidelink connection control method embodiment are implemented, and a same technical effect can be achieved. To avoid repetition, details are not described herein again.

An embodiment of the present disclosure further provides a non-transitory computer-readable storage medium. The non-transitory computer-readable storage medium stores a program, and when the program is executed by a processor, processes of the sidelink connection control method embodiment are implemented, and a same technical effect can be achieved. To avoid repetition, details are not described herein again. The non-transitory computer-readable storage medium is, for example, a read-only memory (ROM for short), a random access memory (RAM for short), a magnetic disk, or an optical disc.

Figure 12:
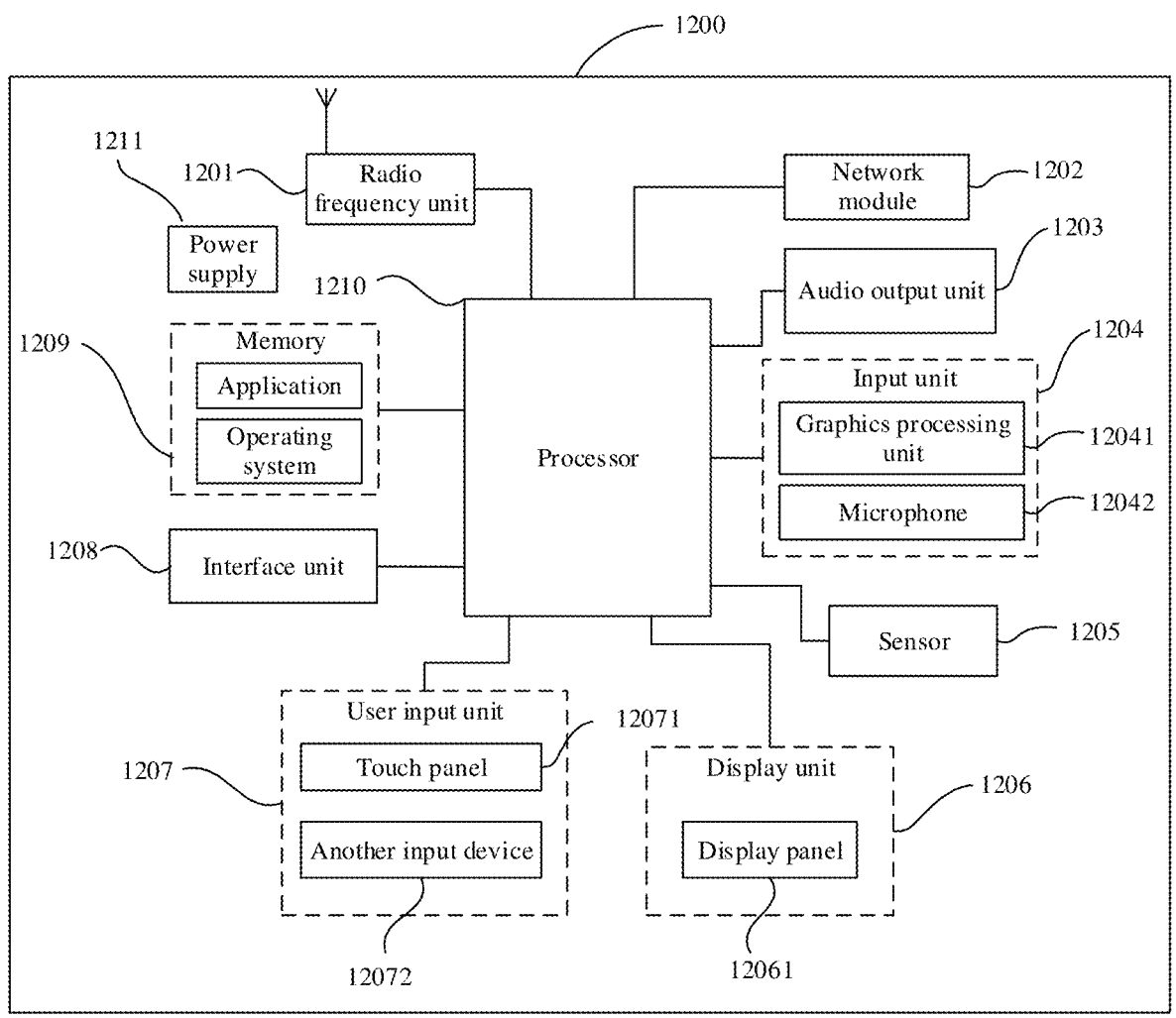
FIG. 12 is a fourth schematic structural diagram of a terminal according to an embodiment of the present disclosure.

FIG. 12 is a schematic diagram of a hardware structure of a terminal implementing the embodiments of the present disclosure. The terminal 1200 includes, but not limited to: a radio frequency unit 1201, a network module 1202, an audio output unit 1203, an input unit 1204, a sensor 1205, a display unit 1206, a user input unit 1207, an interface unit 1208, a memory 1209, a processor 1210, a power supply 1211, and the like. A person skilled in the art may understand that the structure of the terminal shown in FIG. 12 does not constitute a limitation to the terminal. The terminal may include more or fewer components than those shown in the figure, or some components may be combined, or there may be a different component arrangement. In the embodiments of the present disclosure, the terminal includes, but not limited to, a mobile phone, a tablet computer, a notebook computer, a palmtop computer, a vehicle-mounted terminal, a wearable device, and a pedometer.

The radio frequency unit 1201 is configured to obtain an access control parameter used to indicate sidelink connection behavior of a first terminal. The processor 1210 is configured to perform sidelink communication based on the access control parameter.

Alternatively, the radio frequency unit 1201 is configured to send an access control parameter used to indicate sidelink connection behavior of a first terminal.

Alternatively, the radio frequency unit 1201 is configured to obtain a sidelink resource pool configuration parameter sent by a network side device or preconfigured by a network, where the configuration parameter is used to indicate at least one sidelink resource pool and at least one of the following information associated with each sidelink resource pool: a sidelink transmission type, where the sidelink transmission type includes at least one of unicast, groupcast, or broadcast; or at least one QoS parameter; and the processor 1210 is configured to determine a sidelink connection operation based on the configuration parameter.

In this embodiment of the present disclosure, the access control parameter is sent to the first terminal to indicate the sidelink connection behavior of the terminal, and the terminal may perform connection management of sidelink unicast or groupcast based on the received access control parameter, to resolve a congestion problem of a network or a terminal.

Alternatively, in this embodiment of the present disclosure, the network side device configures, for the terminal based on sidelink capability information supported by the terminal, a sidelink resource pool and information associated with the sidelink resource pool, and sends the configuration parameter to the terminal, so that the terminal can perform sidelink unicast or groupcast bearer operation management based on the configuration parameter, to resolve a congestion problem of a network or a terminal.

It should be understood that in this embodiment of the present disclosure, the radio frequency unit 1201 may be configured to receive and send signals in an information receiving and sending process or a calling process. After receiving downlink data from a base station, the radio frequency unit 1201 sends the downlink data to the processor 1210 for processing, and sends uplink data to the base station. Usually, the radio frequency unit 1201 includes, but not limited to, an antenna, at least one amplifier, a transceiver, a coupler, a low noise amplifier, and a duplexer. In addition, the radio frequency unit 1201 may communicate with a network and another device by using a wireless communications system.

The terminal provides a user with wireless broadband Internet access by using the network module 1202, for example, helping the user send and receive emails, browse web pages, and access streaming media.

The audio output unit 1203 may convert audio data received by the radio frequency unit 1201 or the network module 1202 or stored in the memory 1209 into an audio signal and output the audio signal as a sound. In addition, the audio output unit 1203 may further provide audio output (for example, a call signal received voice, or a message received voice) related to a specific function executed by the mobile terminal 1200. The audio output unit 1203 includes a loudspeaker, a buzzer, a receiver, and the like.

The input unit 1204 is configured to receive audio or video signals. The input unit 1204 may include a graphics processing unit (GPU) 12041 and a microphone 12042. The graphics processing unit 12041 processes image data of a static image or a video obtained by an image capture apparatus (for example, a camera) in a video capture mode or an image capture mode. A processed image frame may be displayed on the display unit 1206. An image frame processed by the graphics processing unit 12041 may be stored in the memory 1209 (or another storage medium) or sent by the radio frequency unit 1201 or the network module 1202. The microphone 12042 may receive a sound and can process such sound into audio data. The processed audio data may be converted, in a call mode, into a format that can be sent by using the radio frequency unit 1201 to a mobile communication base station, for outputting.

The terminal 1200 further includes at least one sensor 1205, for example, a light sensor, a motion sensor, and another sensor. The light sensor includes an ambient light sensor and a proximity sensor, where the ambient light sensor can adjust brightness of a display panel 12061 based on brightness of ambient light, and the proximity sensor can turn off the display panel 12061 and/or backlight when the terminal 1200 is moved towards the ear. As a type of motion sensor, an accelerometer sensor may detect an acceleration value in each direction (generally, three axes), and detect a value and a direction of gravity when the accelerometer sensor is static, and may be configured to recognize a terminal posture (for example, screen switching between landscape and portrait modes, a related game, or magnetometer posture calibration), and perform a function related to vibration recognition (for example, a pedometer or a knock), and the like. The sensor 1205 may further include a fingerprint sensor, a pressure sensor, an iris sensor, a molecular sensor, a gyroscope, a barometer, a hygrometer, a thermometer, an infrared sensor, and the like. Details are not described herein again.

The display unit 1206 is configured to display information entered by a user or information provided for a user. The display unit 1206 may include a display panel 12061, and the display panel 12061 may be configured in a form of liquid crystal display (LCD), organic light-emitting diode (OLED), or the like.

The user input unit 1207 can be configured to receive inputted digit or character information, and generate a key signal input related to user setting and function control of the terminal. The user input unit 1207 includes a touch panel 12071 and another input device 12072. The touch panel 12071, also known as a touchscreen, can collect a touch operation performed by a user on or near the touch panel (for example, an operation performed by the user on the touch panel 12071 or near the touch panel 12071 by using any suitable object or accessory such as a finger or a stylus). The touch panel 12071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, transmits the contact coordinates to the processor 1210, receives a command sent by the processor 1210, and executes the command. In addition, the touch panel 12071 may be implemented in various types such as a resistor, a capacitor, an infrared ray, or a surface acoustic wave. In addition to the touch panel 12071, the user input unit 1207 may further include the another input device 12072. The another input device 12072 may include, but not limited to, a physical keyboard, a function key (for example, a volume control key or a switch key), a trackball, a mouse, and a joystick. Details are not described herein.

Optionally, the touch panel 12071 may cover the display panel 12061. When detecting the touch operation on or near the touch panel 12071, the touch panel 12071 transmits the touch operation to the processor 1210 to determine a type of a touch event, and then the processor 1210 provides a corresponding visual output on the display panel 12061 based on the type of the touch event. Although in FIG. 12, the touch panel 12071 and the display panel 12061 implement input and output functions of the terminal as two independent components, in some embodiments, the touch panel 12071 and the display panel 12061 may be integrated to implement the input and output functions of the terminal. This is not specifically limited herein.

The interface unit 1208 is an interface connecting an external apparatus to the terminal 1200. For example, the external apparatus may include a wired or wireless headset jack, an external power supply (or a battery charger) port, a wired or wireless data port, a memory card port, a port for connecting an apparatus having an identification module, an audio input/output (I/O) port, a video I/O port, and a headset jack. The interface unit 1208 may be configured to receive an input (for example, data information and power) from an external apparatus and transmit the received input to one or more elements in the terminal 1200, or may be configured to transmit data between the terminal 1200 and the external apparatus.

The memory 1209 may be configured to store software programs and various data. The memory 1209 may mainly include a program storage area and a data storage area. The program storage area may store an operating system, an application required by at least one function (for example, an audio playing function and an image playing function), and the like. The data storage area may store data (for example, audio data and an address book) created according to use of the mobile phone. In addition, the memory 1209 may include a high speed random access memory, and may further include a non-volatile memory, for example, at least one magnetic disk memory device, a flash memory device, or other volatile solid state memory devices.

The processor 1210 is a control center of the terminal, and is connected to all the parts of the entire terminal by using various interfaces and lines. The processor 1210 performs various functions of the terminal and processes data by running or executing the software programs and/or modules stored in the memory 1209 and by invoking data stored in the memory 1209, to perform overall monitoring on the terminal. The processor 1210 may include one or more processing units. Optionally, an application processor and a modem processor may be integrated into the processor 1210. The application processor mainly processes an operating system, a user interface, an application, and the like. The modem processor mainly processes wireless communication. It may be understood that alternatively, the modem processor may not be integrated into the processor 1210.

The terminal 1200 may further include a power supply 1211 (for example, a battery) that supplies power to various components. Optionally, the power supply 1211 may be logically connected to the processor 1210 by using a power supply management system, to implement functions of managing charging, discharging, and power consumption by using the power supply management system.

In addition, the terminal 1200 includes some function modules not shown, and details are not described herein.

It should be noted that, in this specification, the terms "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such a process, method, article, or apparatus. An element proceeded by "including a . . . " does not, without more constraints, preclude the existence of additional identical elements in the process, method, object, or apparatus that includes the element.

According to the foregoing descriptions of the implementations, a person skilled in the art may clearly understand that the foregoing methods in the embodiments may be implemented by using software plus a required universal hardware platform, or certainly may be implemented by using hardware. However, in many cases, the former is a better implementation. Based on such an understanding, the technical solutions of the present disclosure essentially or the part contributing to related technologies may be implemented in a form of a software product. The computer software product is stored in a storage medium (such as a ROM/RAM, a magnetic disk, or an optical disc) and includes several instructions for instructing user equipment (which may be a mobile phone, a computer, a server, an air conditioner, or a network device) to execute the methods described in the embodiments of the present disclosure.

The embodiments of the present invention are described with reference to the accompanying drawings. However, the present invention is not limited to the foregoing specific implementations. The foregoing specific implementations are merely examples, but are not limiting. A person of ordinary skill in the art may make many forms without departing from the objective and the scope of the claims of the present invention, and these forms all fall within the protection scope of the present invention.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A sidelink connection control method, applied to a first terminal, and comprising:
   obtaining an access control parameter used to indicate sidelink connection behavior of the first terminal; and
   performing sidelink communication based on the access control parameter;
   wherein the obtaining the access control parameter used to indicate the sidelink connection behavior of the first terminal comprises:
   receiving the access control parameter sent by a second terminal, wherein the access control parameter comprises at least one of:
      second indication information used to indicate whether it is allowed to initiate a sidelink unicast establishment request or a sidelink groupcast establishment request to the second terminal;
      second prohibition duration within which initiating the sidelink unicast establishment request or the sidelink groupcast establishment request to the second terminal is prohibited; or
      a second prohibition factor used to assist the first terminal in determining whether the first terminal is prohibited from initiating the sidelink unicast establishment request or the sidelink groupcast establishment request to the second terminal;
   wherein the performing sidelink communication based on the access control parameter comprises:
      when it is determined, based on the access control parameter, that the first terminal is prohibited from initiating the sidelink unicast establishment request or the sidelink groupcast establishment request to the second terminal, running a second prohibition timer; and
      when the second prohibition timer stops or expires, initiating the sidelink unicast establishment request or the sidelink groupcast establishment request to the second terminal.

2. The method according to claim 1, wherein the obtaining the access control parameter used to indicate sidelink connection behavior of the first terminal further comprises:
   receiving the access control parameter sent by a network side device, wherein the access control parameter comprises at least one of:
   first indication information used to indicate whether sidelink transmission of the first terminal is allowed to use a resource allocation mode being network scheduling;
   first prohibition duration within which sidelink transmission of the first terminal is prohibited from using the resource allocation mode being network scheduling; or
   a first prohibition factor used to assist the first terminal in determining whether sidelink transmission of the first terminal is prohibited from using the resource allocation mode being network scheduling.

3. The method according to claim 2, further comprising:
   determining target information having an association relationship with the access control parameter, wherein the target information comprises at least one of:
   a sidelink transmission type, wherein the sidelink transmission type comprises at least one of unicast, groupcast, or broadcast; or
   at least one quality of service (QOS) parameter.

4. The method according to claim 3, wherein the performing sidelink communication based on the access control parameter further comprises:
   determining, based on a sidelink transmission type of to-be-transmitted data, an access control parameter matching the sidelink transmission type of the to-be-transmitted data; or
   determining, based on a QoS requirement of to-be-transmitted data, an access control parameter matching the QoS requirement of the to-be-transmitted data; or
   determining, based on the sidelink transmission type of to-be-transmitted data, an access control parameter matching the sidelink transmission type of the to-be-transmitted data, and determining, based on the QoS requirement of to-be-transmitted data, an access control parameter matching the QoS requirement of the to-be-transmitted data;

running a first prohibition timer when it is determined, based on the determined access control parameter, that sidelink transmission of the first terminal is prohibited from using the resource allocation mode being network scheduling, and when the first prohibition timer stops or expires, sending, to the network side device, an uplink message needed by the resource allocation mode being network scheduling.

5. The method according to claim 2, wherein when the first terminal supports a resource allocation mode being autonomous selection or scheduling by another terminal, the method further comprises:

running a first prohibition timer when it is determined, based on the access control parameter, that sidelink transmission of the first terminal is prohibited from using the resource allocation mode being network scheduling, and during running of the first prohibition timer, switching, by the first terminal, to the resource allocation mode being autonomous selection or scheduling by another terminal.

6. A terminal, being a first terminal, comprising a processor, a memory, and a program that is stored in the memory and executable on the processor, wherein when the program is executed by the processor, the first terminal performs:

obtaining an access control parameter used to indicate sidelink connection behavior of the first terminal; and performing sidelink communication based on the access control parameter;

wherein the obtaining the access control parameter used to indicate the sidelink connection behavior of the first terminal comprises:

receiving the access control parameter sent by a second terminal, wherein the access control parameter comprises at least one of:

second indication information used to indicate whether it is allowed to initiate a sidelink unicast establishment request or a sidelink groupcast establishment request to the second terminal;

second prohibition duration within which initiating the sidelink unicast establishment request or the sidelink groupcast establishment request to the second terminal is prohibited; or a second prohibition factor used to assist the first terminal in determining whether the first terminal is prohibited from initiating the sidelink unicast establishment request or the sidelink groupcast establishment request to the second terminal;

wherein the performing sidelink communication based on the access control parameter comprises:

when it is determined, based on the access control parameter, that the first terminal is prohibited from initiating the sidelink unicast establishment request or the sidelink groupcast establishment request to the second terminal, running a second prohibition timer; and when the second prohibition timer stops or expires, initiating the sidelink unicast establishment request or the sidelink groupcast establishment request to the second terminal.

7. The terminal according to claim 6, wherein when the program is executed by the processor, the first terminal further performs:

receiving the access control parameter sent by a network side device, wherein the access control parameter comprises at least one of:

first indication information used to indicate whether sidelink transmission of the first terminal is allowed to use a resource allocation mode being network scheduling;

first prohibition duration within which sidelink transmission of the first terminal is prohibited from using the resource allocation mode being network scheduling; or a first prohibition factor used to assist the first terminal in determining whether sidelink transmission of the first terminal is prohibited from using the resource allocation mode being network scheduling.

8. A non-transitory computer-readable storage medium, wherein the non-transitory computer-readable storage medium stores a program, and when the program is executed by a processor, steps of the sidelink connection control method according to claim 1 are implemented.

9. A sidelink connection control method, applied to a second terminal, and comprising:

sending, to a first terminal, an access control parameter used to indicate sidelink connection behavior of a first terminal;

wherein the access control parameter comprises at least one of:

second indication information used to indicate whether it is allowed to initiate a sidelink unicast establishment request or a sidelink groupcast establishment request to the second terminal;

second prohibition duration within which initiating the sidelink unicast establishment request or the sidelink groupcast establishment request to the second terminal is prohibited; or a second prohibition factor used to assist the first terminal in determining whether the first terminal is prohibited from initiating the sidelink unicast establishment request or the sidelink groupcast establishment request to the second terminal;

wherein the access control parameter is used by the first terminal to run a second prohibition timer when it is determined that the first terminal is prohibited from initiating the sidelink unicast establishment request or the sidelink groupcast establishment request to the second terminal; and when the second prohibition timer stops or expires, initiate the sidelink unicast establishment request or the sidelink groupcast establishment request to the second terminal.

10. A terminal, comprising a processor, a memory, and a program that is stored in the memory and executable on the processor, wherein when the program is executed by the processor, the terminal device performs steps of the sidelink connection control method according to claim 9.

11. A non-transitory computer-readable storage medium, wherein the non-transitory computer-readable storage medium stores a program, and when the program is executed by a processor, steps of the sidelink connection control method according to claim 9 are implemented.

12. The terminal according to claim 7, wherein when the program is executed by the processor, the first terminal further performs:

determining target information having an association relationship with the access control parameter, wherein the target information comprises at least one of:

a sidelink transmission type, wherein the sidelink transmission type comprises at least one of unicast, groupcast, or broadcast; or at least one quality of service (QOS) parameter.

13. The terminal according to claim 12, wherein when the program is executed by the processor, the first terminal further performs:
- determining, based on a sidelink transmission type of to-be-transmitted data, an access control parameter matching the sidelink transmission type of the to-be-transmitted data; or
- determining, based on a QoS requirement of to-be-transmitted data, an access control parameter matching the QoS requirement of the to-be-transmitted data; or
- determining, based on the sidelink transmission type of to-be-transmitted data, an access control parameter matching the sidelink transmission type of the to-be-transmitted data, and determining, based on the QoS requirement of to-be-transmitted data, an access control parameter matching the QoS requirement of the to-be-transmitted data;
- running a first prohibition timer when it is determined, based on the determined access control parameter, that sidelink transmission of the first terminal is prohibited from using the resource allocation mode being network scheduling, and
- when the first prohibition timer stops or expires, sending, to the network side device, an uplink message needed by the resource allocation mode being network scheduling.

14. The terminal according to claim 7, wherein in a case that the first terminal supports a resource allocation mode being autonomous selection or scheduling by another terminal, when the program is executed by the processor, the first terminal further performs:
- running a first prohibition timer when it is determined, based on the access control parameter, that sidelink transmission of the first terminal is prohibited from using the resource allocation mode being network scheduling, and
- during running of the first prohibition timer, switching, by the first terminal, to the resource allocation mode being autonomous selection or scheduling by another terminal.

\* \* \* \* \*